(No Model.)
E. F. LEWIS.
FODDER OR FEED LOADER AND SLED.
No. 530,782. Patented Dec. 11, 1894.
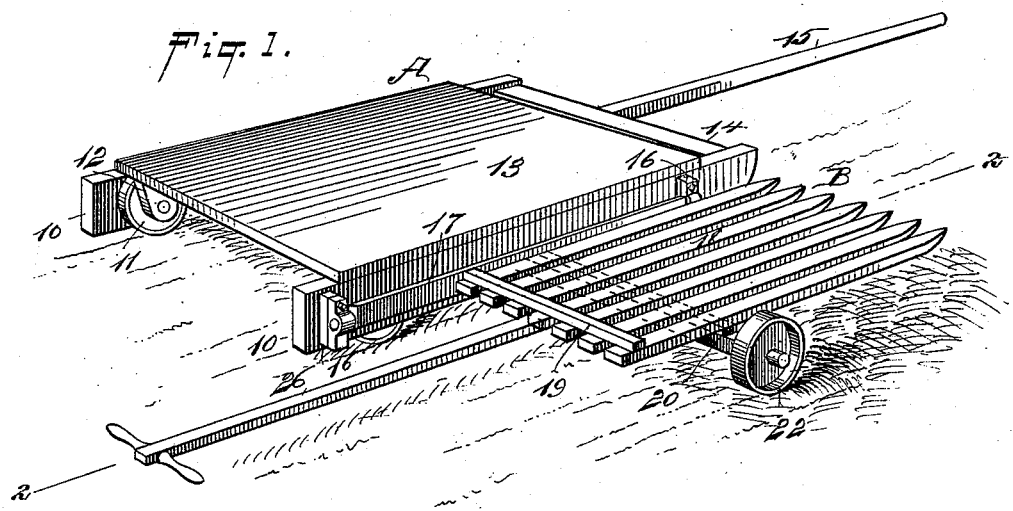
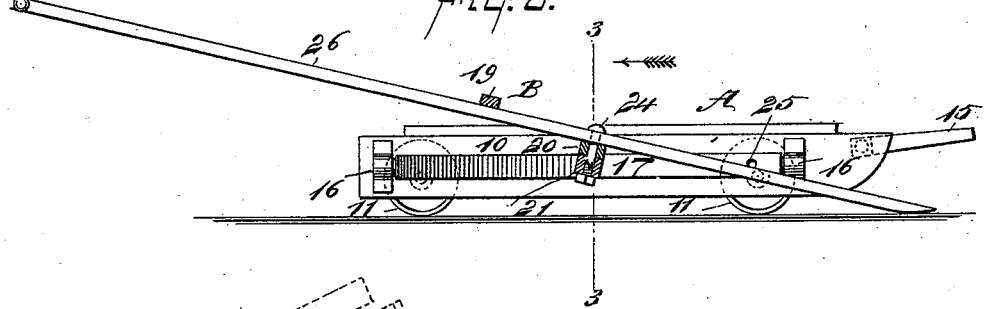
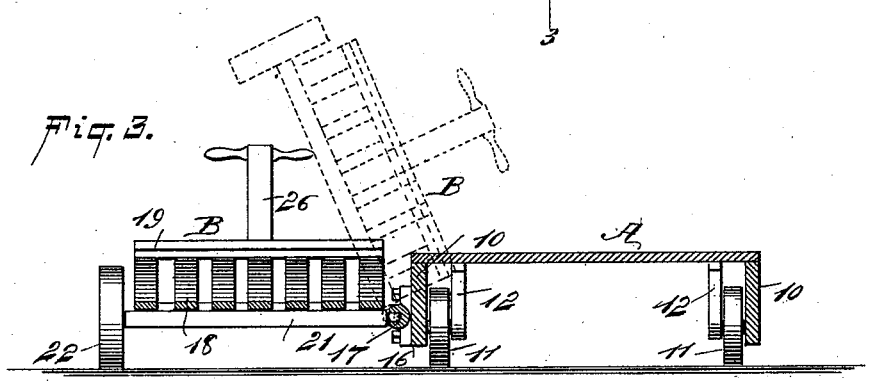
WITNESSES:
William Goebel.
J. Fed. Acker.
INVENTOR
E. F. Lewis
BY Munn & Co
ATTORNEYS.

UNITED STATES PATENT OFFICE.

EDWIN FLETCHER LEWIS, OF VINE CREEK, KANSAS.

FODDER OR FEED LOADER AND SLED.

SPECIFICATION forming part of Letters Patent No. 530,782, dated December 11, 1894.

Application filed April 13, 1894. Serial No. 507,459. (No model.)

*To all whom it may concern:*

Be it known that I, EDWIN FLETCHER LEWIS, of Vine Creek, in the county of Ottawa and State of Kansas, have invented a new and Improved Fodder or Feed Loader and Sled, of which the following is a full, clear, and exact description.

My invention relates to an improvement in fodder or feed loaders and carriers therefor, and it has for its object to provide a means whereby a loader may be employed in connection with a sled or like vehicle, the loader being so constructed that as the sled or vehicle is drawn over the field the loader may be made to enter beneath the shock and gather a predetermined amount of hay, and whereby when the loader has received a sufficient quantity it may be manipulated in a manner to carry a portion of its length over the sled or vehicle, thereby admitting of a ready transfer of the material, and whereby the loader may be elevated and the load thus dropped therefrom upon the sled or vehicle.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in all the views.

Figure 1 is a perspective view of the improved machine. Fig. 2 is a longitudinal section, taken essentially on the line 2—2 of Fig. 1, illustrating the loader in working position. Fig. 3 is a transverse section taken essentially on the line 3—3 of Fig. 2; and Fig. 4 is a detail view, illustrating the connection between the sled or vehicle and the dumping device.

In carrying out the invention the sled or carrier for the material to be gathered consists of two runners 10 of suitable length, which runners may be used independent of wheels, if desired, or may be provided with wheels and preferably are so provided, in which event the wheels 11 are located one near each end of each runner at the inner face thereof, the wheels extending but a short distance downward below the wearing faces of the runners, suitable brackets 12, being provided at the inner faces of the runners to receive the said wheels. The sled or carrying vehicle is completed by the addition of a platform 13, which extends from runner to runner, a front pivoted bar 14, and a pole or tongue 15 attached to the said bar for the accommodation of the team.

Upon the outer face of one of the runners boxes 16 are secured in any approved manner, said boxes being located one near the front and the other near the rear end of the runner, as shown best in Fig. 1, and these boxes are adapted to journal the ends of a dumping bar 17. This dumping bar is adapted as a partial support for the gathering or loading device B, and serves likewise to connect said device with the sled or vehicle A. The gathering device consists of a body or platform constructed of a series of slats 18, united at one end by a cross bar 19, usually located upon their upper faces, and at a point between their ends by a second cross bar 20 which is secured to the under faces of the slats. The free ends of the slats are pointed, and the under surfaces of the slats at their free ends are preferably beveled, as shown best in Fig. 2. An axle 21 is provided, carrying a supporting wheel 22 loosely mounted at its outer end, and the inner end of this axle is held to turn in a bearing 23, formed in the dumping bar 17, the connection being made either as shown in Fig. 4, in which the spindle of the axle extends through the bar and is held in position by a cotter pin, or other means may be employed if in practice it is found desirable.

The slatted or gathering platform 18 of the loading device is so located that when it is placed upon the axle it may be turned in a manner to carry its free or gathering end over the platform 13 of the sled or vehicle, and to that end the slatted or gathering platform of the loading device is pivoted to its supporting axle 21 by means of a pivot pin 24, or the equivalent thereof. Normally the gathering platform 18 will stand in the inclined position shown in Fig. 2, in which position it will gather grain, or receive material in its path.

When going to or from the field, or when the loader is not needed, it may be held in a horizontal position by passing a suitable brace beneath the bottom portion of its gathering end and into a recess 25 made in the dumping bar; but if in practice it is so desired, the gathering platform may be made to balance itself, in which event when it is in gathering position suitable retaining devices must be employed to maintain it in such position. The gathering platform is provided with a handle 26, which extends rearwardly therefrom, and by means of which it may be turned upon its pivot.

In the operation of this machine, the gathering platform being placed in the inclined position shown in Fig. 2, as the machine is drawn over the surface of the ground and the platform approaches a shock, the shock will be received upon the platform, the latter passing beneath the shock, and when the shock is in proper position upon the platform, the said gathering platform may be carried over the platform of the sled or vehicle, and the shock may be readily transferred from the former to the latter; or the gathering platform may be carried to a vertical position, or substantially so, by hand, as shown in Fig. 3, in which event the load will be dumped upon the platform of the sled. The shocks before they are received upon the gathering platform are preferably tied together so that the wind cannot scatter any of the straw while the loading is being accomplished, or when the shocks are gathered upon the sled, since they will then lie upon their sides.

It is evident that this device may likewise be used for loading straw or other material lying loosely upon the ground, or placed in piles, and that the work of loading and transferring the material from the field to the place where it is to be stored may be accomplished expeditiously and conveniently when a machine of the above character is used.

Having thus described my invention, I claim as new and desire to secure by Letters Patent—

A machine for gathering and carrying hay comprising the low wheeled-sled having a longitudinal bar journaled on one side and provided between its ends with a transverse bearing, a slotted gathering platform having an axle between its ends, the inner end of the axle being mounted in said transverse bearing, a wheel on the outer end of the axle and a rearwardly extending handle on the said platform by which its inclination may be changed, substantially as described.

EDWIN FLETCHER LEWIS.

Witnesses:
   JACOB V. REED,
   J. F. BREWER.